United States Patent
Frank et al.

(10) Patent No.: US 7,894,485 B2
(45) Date of Patent: Feb. 22, 2011

(54) METHOD AND DEVICE OF TRANSMITTING SDH SERVICES IN PASSIVE OPTICAL NETWORK

(75) Inventors: Effenberger Frank, Shenzhen (CN); Jun Zhao, Shenzhen (CN); Wei Huang, Shenzhen (CN); Wei Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 220 days.

(21) Appl. No.: 11/889,630

(22) Filed: Aug. 15, 2007

(65) Prior Publication Data

US 2008/0044182 A1 Feb. 21, 2008

(30) Foreign Application Priority Data

Aug. 16, 2006 (CN) .................... 2006 1 0109399

(51) Int. Cl.
*H04J 3/00* (2006.01)

(52) U.S. Cl. .................... 370/498; 370/466; 370/395.51

(58) Field of Classification Search ................ 370/222, 370/236, 476, 395.51, 498, 254; 398/52, 398/72

See application file for complete search history.

(56) References Cited

U.S. PATENT DOCUMENTS

| 5,539,750 | A * | 7/1996 | Kivi-Mannila et al. ....... 370/506 |
| 5,712,845 | A * | 1/1998 | Peltomaki .................... 370/226 |
| 6,347,096 | B1 * | 2/2002 | Profumo et al. ............. 370/476 |
| 6,870,877 | B2 * | 3/2005 | Notani ........................ 375/221 |
| 6,891,863 | B1 * | 5/2005 | Penkler et al. .............. 370/539 |
| 7,031,343 | B1 * | 4/2006 | Kuo et al. ................... 370/473 |
| 7,277,459 | B1 * | 10/2007 | Abbas ........................ 370/539 |
| 7,353,288 | B1 * | 4/2008 | Rangavajjhala et al. ..... 709/236 |
| 2001/0021171 | A1 * | 9/2001 | Notani ........................ 370/222 |
| 2004/0052274 | A1 * | 3/2004 | Wang et al. ................. 370/468 |

(Continued)

FOREIGN PATENT DOCUMENTS

CN 1536812 A 10/2004

(Continued)

OTHER PUBLICATIONS

"GPON—GEM"; China Academic Journal Electronic Publishing House; Telecommunications Network Technology, No. 11, pp. 10-14, (2004).

(Continued)

*Primary Examiner*—William Trost, IV
*Assistant Examiner*—Emmanuel Maglo
(74) *Attorney, Agent, or Firm*—Finnegan, Henderson, Farabow, Garrett & Dunner, LLP (57) ABSTRACT

A method of carrying SDH services in PON is provided, in which tributary units carrying SDH service data are mapped into payload part of GEM frames, thereby implementing transmission of SDH services in GPON. De-capsulation is performed in reverse process at receiving end. A device of receiving or transmitting SDH services and a method of mapping SDH data frame into PON data frame are also provided. The present invention may be merged with SDH network directly since standard SDH tributary unit structure is adopted, and extraction of virtual containers that includes SDH service data and synchronism can be accomplished conveniently based on pointer adjustment mechanism adopted by tributary units.

22 Claims, 5 Drawing Sheets

U.S. PATENT DOCUMENTS

2004/0052528 A1* 3/2004 Halgren et al. ............... 398/75
2004/0202470 A1   10/2004 Lim et al.
2004/0246989 A1* 12/2004 Brolin ....................... 370/466
2007/0025735 A1   2/2007 Sakamoto et al.
2007/0211763 A1* 9/2007 Solomon et al. ............ 370/498

FOREIGN PATENT DOCUMENTS

WO    WO-2007/070516 A2    6/2007

OTHER PUBLICATIONS

Li et al.; "The Key Technologies of GPON-GEM Encapsulation"; China Academic Journal Electronic Publishing House, pp. 1-4, (2005).

International Search Report from the Chinese Patent Office for International Application No. PCT/CN2007/070395 (Nov. 15, 2007).

Ernhofer et al.; "Enabling TDM Business Services Across GPON Access Networks"; White Paper, Zarlink Semiconductor, pp. 1-12, (Aug. 2006).

European Search Report issued in European Application No. EP07016117 for search completed Oct. 17, 2007.

First Chinese Office Action of Chinese Application No. 200780000262.6, mailed Aug. 11, 2010.

International Preliminary Report on Patentability dated Feb. 17, 2009 and attached Written Opinion of the International Searching Authority dated Nov. 15, 2007.

Network Node Interface for the Synchronous Digital Hierarchy (SDH), ITU-T Recommendation G.707/Y.1322, Dec. 2003, p. 23-24.

* cited by examiner

METHOD AND DEVICE OF TRANSMITTING SDH SERVICES IN PASSIVE OPTICAL NETWORK

CROSS-REFERENCE TO RELATED APPLICATION

This application claims priority from Chinese Patent Application No. 200610109399.2 filed on Aug. 16, 2006, entitled "Method and device of transmitting SDH services in passive optical network", which is incorporated herein by reference in its entirety.

FIELD OF THE INVENTION

The present invention relates to the field of communication technologies, and in particular to a method and device for transmitting SDH services in a passive optical network.

BACKGROUND OF THE INVENTION

Passive optical network (PON) is a one-point to multi-point optical fiber access network, which includes optical line terminals (OLT) at central office end, optical network units (ONU) or optical network terminals (ONT) at user end and an optical distribution network (ODN). With the development of PON technologies, Gigabit passive optical network (GPON) is becoming a hot spot for study at present. How to carry the existing profitable SDH communication service over GPON networks in a cost-effective manner is an important problem that needs to be settled, in order that GPON is promoted and supported by applications.

In SDH services, Time division multiplexing (TDM) services at various rates play an important role. At present, in a GPON network, there are mainly the following two manners in which a TDM service is carried:

The first one is "TDM over GEM" manner, in which TDM service is mapped into a GEM (GPON Encapsulation method) frame. According to this manner, TDM service is encapsulated by using an unsteady length of GEM frame, and is transmitted limitedly between an OLT and an ONT; and because clock recovery is carried out in an adaptive manner, it is difficult for the clock recovery to meet requirements for controlling jitter and drift; and The second one is "TDM over Ethernet" manner, in which TDM service is transmitted via an Ethernet frame. According to this manner, a code format based on Ethernet frame is required and a larger transmission bandwidth is needed, and therefore the cost of an ONU is increased.

For solving the above problems, an "SDH over GEM" manner is proposed, according to which SDH structure frame is used to implement carrying of TDM service in GPON network. At present, there are mainly the following two methods of implementing the "SDH over GEM":

The first method is to use a modified SDH virtual container (VC) to carry TDM service. Basically, the method includes: modifying frame structures of SDH VC11 and VC12, mapping TDM services at T1 rate and E1 rate into the modified frame structures of VC11 and VC12 respectively, encapsulating each block of the modified VC11 and VC12 into a GEM frame, and transmitting TDM services via GEM frames. According to this method, it is required to modify the structure of a service frame for mapping, and an SDH frame can not be transmitted to an ONT directly; a structured transmission of TDM service cannot be accomplished because the structure thereof is not standard; and byte adjustment can not be achieved because a virtual container only provides a positive and reverse adjustment and filling bits.

The second method is to encapsulate various types of TDM services into frame structures of an SDH virtual tributary, in a payload form of ignoring data structures, or in a payload form of locking to data structure, or in a floating payload form of indicating data structure using a pointer; to encapsulate the virtual tributary into an Ethernet frame, and encapsulate the Ethernet frame into payload of a GEM frame, i.e., TDM service is carried in GPON network in "Ethernet over GEM" manner. Although in this method there is no need to modify the existing standards, TDM service has to undergo three mappings through VT, Ethernet and GPON. Thus this method is complicated in implementation and results in a high protocol overhead cost and larger bandwidth.

SUMMARY OF THE INVENTION

The present invention provides a method and device of carrying and receiving SDH service in a passive optical network, which can be merged with an SDH network directly without modifying frame structure of the existing standard SDH tributary unit (TU). According to the method and device, SDH service data can be extracted in a simplified way.

The present invention also provides a method of mapping an SDH data frame into a passive optical network data frame, so that SDH service can be transmitted over a passive optical network.

The present also provides a method of carrying an SDH service over a PON (passive optical network). The method includes:

encapsulating a tributary unit carrying SDH service data into a PON encapsulation method data frame; and transmitting the PON encapsulation method data frame.

The present invention also provides a method of receiving an SDH service in a PON. The method includes:

receiving a PON encapsulation method data frame; and extracting an SDH tributary unit that is loaded in a payload part of the PON encapsulation method data frame.

The present invention also provides a device of transmitting an SDH service. The device includes:

an encapsulating module, adapted to encapsulate a tributary unit carrying SDH service data into a PON encapsulation method data frame; and a transmitting module, adapted to transmit the PON encapsulation method data frame.

The present invention provides a device of receiving an SDH service. The device includes:

a receiving module, adapted to receive a PON encapsulation method data frame; and a first de-capsulating module, adapted to extract from the PON encapsulation method data frame received by the receiving module an SDH tributary unit that is loaded in a payload part of the PON encapsulation method data frame.

The present invention also provides a method of mapping an SDH data frame into a PON data frame. The method includes:

mapping the entire data frame of an SDH tributary unit into a payload part of a PON data frame; and identifying type of the tributary unit in the payload part of the PON data frame using a length indicator in a head of the PON data frame.

The present invention accomplishes transmission of SDH service in GPON by adopting the method of directly mapping SDH tributary units into GEM frames. Because the standard SDH tributary unit frame structure is adopted in the present

DETAILED DESCRIPTIONS OF THE EMBODIMENTS

An embodiment of the present invention provides a method of carrying and receiving SDH service in a passive optical network, according to which an SDH tributary unit that carries SDH service is mapped into GEM payload directly, thereby accomplishing transmission of SDH service in GPON. TDM services at various rates may be loaded into corresponding types of TUs according to the existing SDH specified encapsulation process. Different types of the TUs are periodically loaded into GEM frames according to framing periods thereof and are transmitted. At the receiving end, the de-capsulation process is carried out by reverse engineering, and SDH service data is forwarded or extracted. The receiving end may determine the type of a carried TU through Payload Length Indicator (PLI) of a GEM frame, and may also negotiate the type of a TU carried by GEM through ONU Management and Control Interface (OMCI). In addition, for the purpose of avoiding clock jitter resulted from a service halt caused by situations such as a ranging process, according to an embodiment of the present invention, several extracted tributary units are buffered at the receiving end which needs to forward services, and if there is a halt in the receiving of a passive optical network (PON) encapsulation method data frame, the buffered tributary units are used for transmission, therefore preventing clock jitter caused by a service halt. Embodiments of the present invention also provide the corresponding encapsulating devices and de-capsulating devices. The methods and devices according to embodiments of the present invention will now be described in detail.

Embodiment 1

Figure 1:
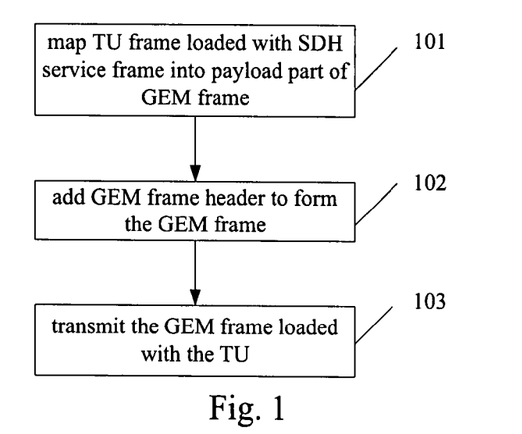
FIG. 1 is a schematic diagram of a method of carrying SDH service in a GPON according to a first embodiment of the present invention.

A method of carrying SDH service in a GPON is provided, as shown in FIG. 1. The method includes the following steps:

101: Mapping a TU that carries SDH service into payload part of a GEM frame;

102: Adding header of the GEM frame to form the GEM frame;

103: Transmitting the GEM frame that carries the TU structure.

The process of encapsulating a TU that carries SDH service into a GEM frame is accomplished after the above steps 101 and 102.

Figure 2:
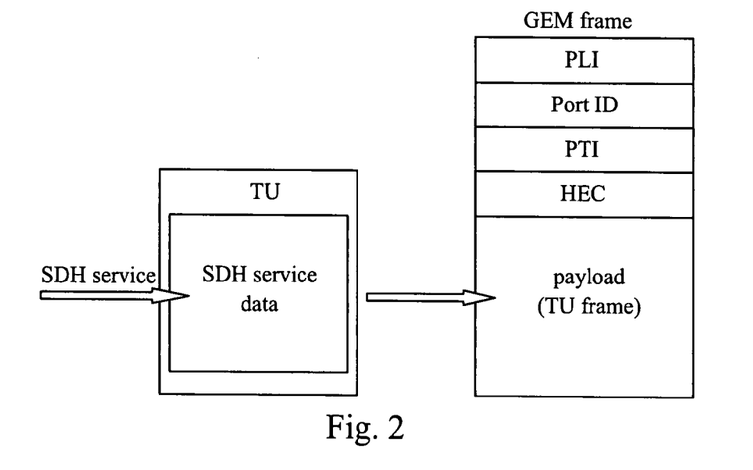
FIG. 2 is a schematic diagram of mapping a TU into a GEM frame according to the first embodiment of the present invention.

In the embodiment, GEM frames of variable lengths are used to carry SDH TUs of various types. A TU is mapped into payload part of a GEM frame, and five bytes are added as a GEM header, and thereby the GEM frame is formed, as shown in FIG. 2. The header of a GEM frame includes the following four parts: Payload Length Indicator (PLI, 12 bits), Port Identification (PID, 12 bits), Payload Type Indicator (PTI, 3 bits) and Header Error Control (HEC, 13 bits). The length of payload part of a GEM frame that carries a TU is fixed and is determined by the TU structure.

TU may be obtained from SDH service data encapsulation, and may also be received from a device with an SDH interface. The process of encapsulating SDH service data as a TU will be briefly provided to describe TU type and structure.

TDM service, which is one kind of SDH service, is taken as an example. Generally, TDM service data is of different types, such as T1, E1, T2, T3 and T4, in which, T1 corresponds to a data rate of 1544 kbps, E1 corresponds to a data rate of 2048 kbps, T2 corresponds to a data rate of 6312 kbps, T3 corresponds to a data rate of 44736 kbps, and E3 corresponds to a data rate of 34368 kbps.

In an SDH transmission structure, TU are divided into three types: TU-1, TU-2, and TU-3, in which TU-1 further includes TU-11 and TU-22, which are used to carry E1 and T1 respectively; TU-2 is used to carry T2, and TU-3 is used to carry T3 and E3.

Figure 3:
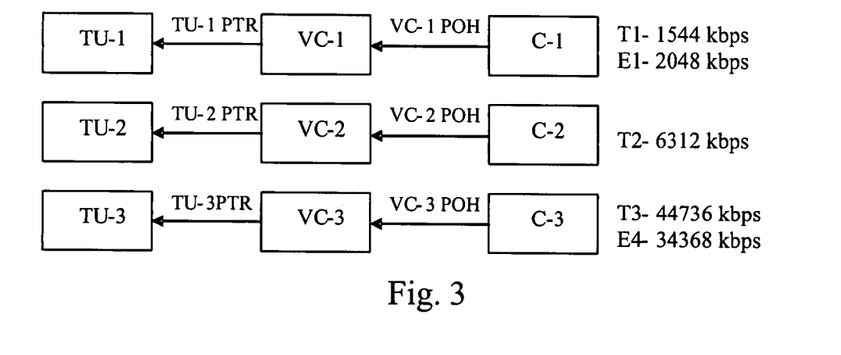
FIG. 3 is a schematic diagram of loading TDM service data into TU paths according to the first embodiment of the present invention.

TDM service at these different data rates may be loaded into different types of TUs according to the existing SDH specification on mapping and framing, as shown in FIG. 3. The loading process includes:

Step 1: Mapping TDM service data into corresponding SDH standard containers according to data rates of the TDM service data;

Loading T1, E1 into a standard container C-1, in which T1 corresponds to a standard container C-11, and E1 corresponds to a standard container C-12; C-11 and C-12 are multi-frames each including four sub-frames; C-11 has 4(9×3−2)=100 bytes, and C-12 has 4(9×4−2)=136 bytes; the framing period of multi-frames C-11 and C-12 is 500 μs;

Loading T2 into a standard container C-2; C-2 is a multi-frame including four sub-frames, C-2 has 4(9×12−2)=424 bytes; the framing period of multi-frame C-2 is 500 μs;

Loading T3, E3 into a standard container C-3; C-3 only includes one sub-frame and has 9×85=765 bytes; the framing period of multi-frame C-3 is 125 μs;

The standard container mainly performs an adaptation function such as rate adjustment. TDM service data, after being adjusted in code rate in a standard container, is changed to a synchronous signal;

Step 2: Adding Path Overhead to standard containers C-n (n=1, 2, 3) to form corresponding VC-n;

POH of VC-1 (comprising VC-11 and VC-12) or VC-2 consists of four bytes: V5, J2, N2 and K4, which are added in the front end of the four sub-frames to form VC-1/2 multi-frames respectively; V5, which is the first byte of a multi-frame, provides functions of error code detection, signal labeling, path status indication and etc; J2 is a path trace byte, for containing access point indicator of low-level channel; N2 is a network operator byte, for providing a function of serially monitoring low-level channels; the first to fourth bits of K4 byte are used for transmitting channel protection signaling, and the fifth to seventh bit of K4 byte are used for indicating distal end invalidation, and the eighth bit is reserved.

POH of VC-3 consists of nine bytes: J1, B3, C2, G1, F2, H4, F3, K3 and N1, and ranks in the first column of VC-3 frame structure. J1 is a path trace byte, for containing access point indicator of high-level path; B3 contains channel BIP-8 code, and has a function of monitoring high-level channel error code; C2 is a signal label byte, for indicating the multi-structure and payload nature of a VC frame; G1 is a valid path status byte, for monitoring path status and performance; F2 and F3 are path user bytes, for providing official business communication between path units; H4 is a position indicator byte, for indicating type of multi-frames in payload and payload position; the first to fourth bytes of K3 byte are used for transmitting channel protection signaling, and the fifth to eighth bytes thereof are reserved; N1 is a network operator byte, capable of providing function of serially monitoring high-level paths.

Step 3: Adding pointer (TU PTR: tributary pointer) overhead to VC-n (n=1, 2, 3) to form TU-n.

Figure 4:
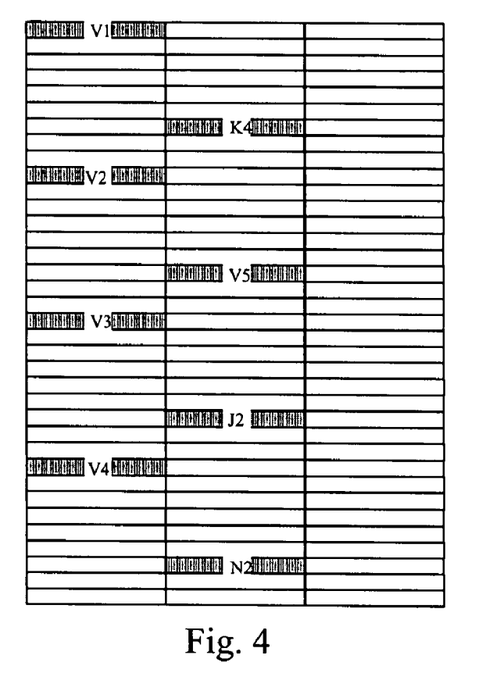
FIG. 4 is a schematic diagram of TU-11 structure according to the first embodiment of the present invention.
Figure 5:
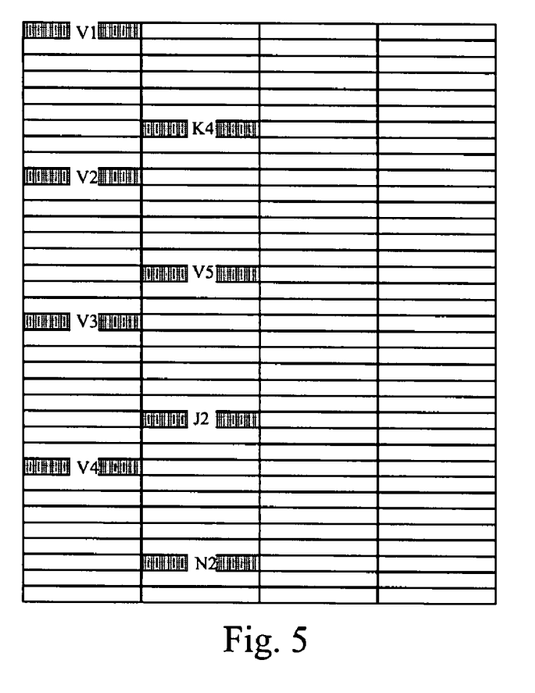
FIG. 5 is a schematic diagram of TU-12 structure according to the first embodiment of the present invention.
Figure 6:
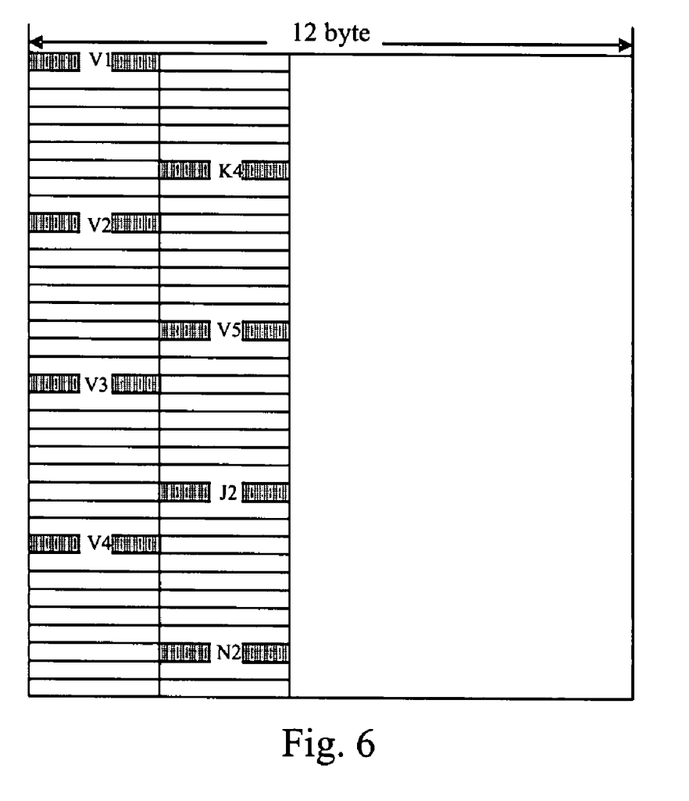
FIG. 6 is a schematic diagram of TU-2 structure according to the first embodiment of the present invention.

TU-1/2 PTR includes four bytes: V1, V2, V3 and V4. V1 and V2 are real pointer bytes, for indicating specific position of the first byte V5 of VC-1/2 multi-frame in the TU-1/2; V3 is negative adjustment position byte; V4 is a reserved byte. The structures of TU-11, TU-12 and TU-2, which are formed by adding pointers to VC-n (n=1, 2, 3), are shown in FIGS. 4, 5 and 6 respectively. FIG. 4 shows the block-form frame structure of TU-11, in which 4 rows×(3×9) columns are included. Similarly, FIG. 5 shows the block-form frame structure of TU-12, in which 4 rows×(4×9) columns are included, and FIG. 6 shows the block-form frame structure of TU-2, in which 4 rows×(12×9) columns are included.

Figure 7:
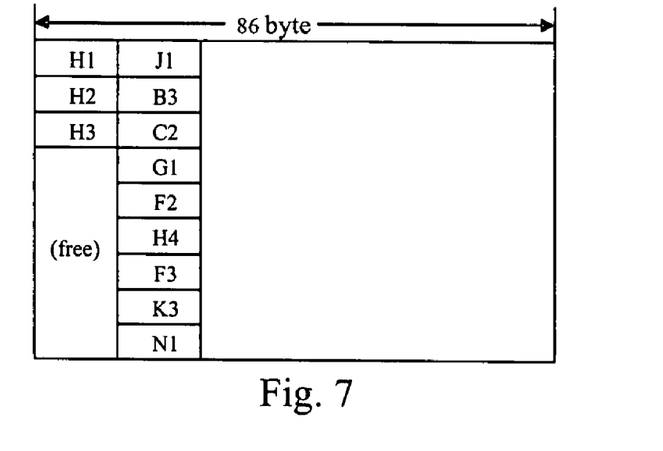
FIG. 7 is a schematic diagram of TU-3 structure according to the first embodiment of the present invention.

TU-3 PTR includes three bytes: H1, H2 and H3. H1 and H2 are practical pointer bytes, indicating drift amount between the first byte J1 in VC-3 frame and the last byte H3 in the pointer; H3 is a negative adjustment position byte. TU-3, which is formed by adding the pointers, is shown in FIG. 7. In FIG. 7, the block-form frame structure of TU-3 is shown, in which 9 rows×85 columns plus 3 bytes are included.

TU PTR pointers may be used to adjust payload bytes, to carry out frequency and phase calibration, and to tolerate frequency jitter and drift in the network.

It can be obtained from the above TU framing period that, for ensuring clock synchronization, TU-1 and TU-2 are loaded into a GEM frame once every 500 μs and are transmitted, and TU-3 is loaded into a GEM frame once every 125 μs and are transmitted. The transmission periods are based on the GPON system clock, and therefore the GPON system clock is synchronized with the SDH transmission system clock, ensuring the integrity of the clock.

The present invention accomplishes transmission of SDH service in GPON by adopting the method of directly mapping a SDH tributary unit into a GEM frame. Because the standard SDH tributary unit frame structure is adopted in the present invention, the present invention can be merged with an SDH network and can implement extraction of VC carrying SDH service data and service clock synchronization on the basis of the pointer adjustment mechanism adopted by the tributary unit.

In addition, an embodiment of the present invention also provides the specific solution of mapping TDM service at various data rates into different types of tributary units and encapsulating them into GEM frames periodically, which may be applied in the existing GPON system.

Embodiment 2

Figure 8:
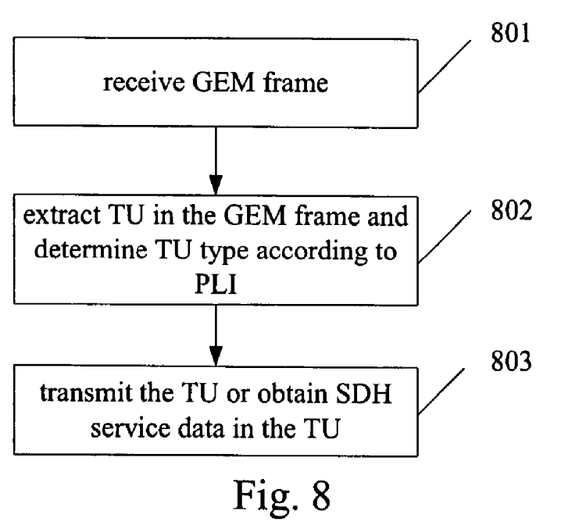
FIG. 8 is a schematic diagram of a method of receiving SDH service in a GPON according to a second embodiment of the present invention.

A method of receiving SDH service in GPON is provided, the flow of which is shown in FIG. 8. The method of embodiment 2 is a reverse process corresponding to that of embodiment 1, in which SDH service transmitted in embodiment 1 is received. The method includes:

801: Receiving a GEM frame.

802: Extracting a TU in payload part of the GEM frame; since the payload part of the GEM frame that carries the TU is fixed in length, the type of the carried TU may be determined through PLI of the GEM frame.

803: Performing service transmission of the TU according to the type thereof or obtaining corresponding SDH service data from the payload part of the TU.

If the device which implements the receiving method of this embodiment is central office equipment, e.g., an OLT, service transmission of TU may also be performed in step 803, e.g., forwarding the TU to an SDH network that is connected, and of course, corresponding operations such as multiplexing, encapsulation, etc may be performed as needed during transmission. When the service transmission of the TU is carried out, the mechanism of avoiding clock jitter caused by halt in the receiving of GEM frames is adopted, i.e., several TUs are buffered, and when a halt occurs in the receiving of GEM frames, the buffered TUs are transmitted. A specific application scenario of the mechanism is the ranging process in a PON system. When ranging procedure is performed in a PON system, all services of normally-working ONUs/ONTs will be interrupted for 2 frames, i.e., if the ONU/ONT is in a transmission state, its transmission will be stopped for 2 frames. During these 2 frames, the OLT at the receiving end can not receive a GEM frame transmitted by the ONU/ONT, and the buffered TUs may be used for service transmission, and therefore time jitter caused by service halt can be avoided.

If the device which implements the receiving method of this embodiment is terminal type equipment at user side, e.g. OLT, etc, acquisition of SDH service data may be performed in step 803. The acquisition process can be performed according to the standard SDH receiving process, specifically including: determining specific position of a VC in the TU based on a TU PTR pointer, extracting the VC, terminating POH overhead of the VC, and obtaining SDH service data in the payload.

Embodiment 3

Figure 9:
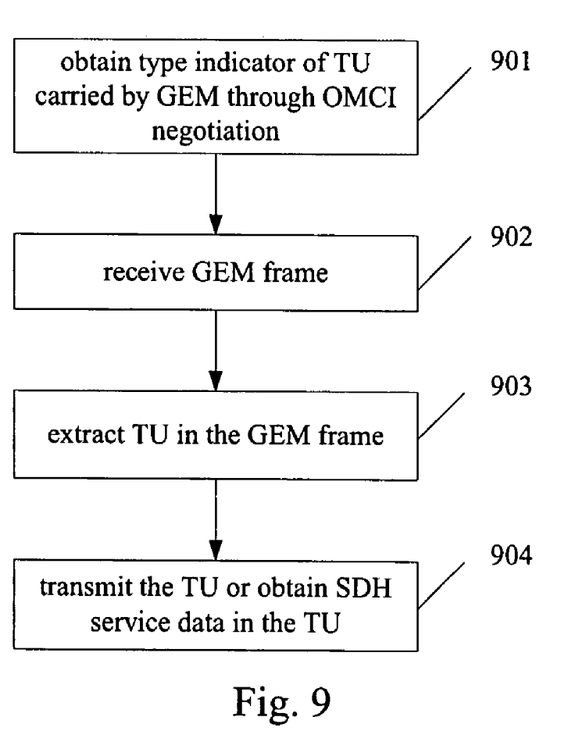
FIG. 9 is a schematic diagram of a method of receiving SDH service in a GPON according to a third embodiment of the present invention.

A method of receiving SDH service in GPON is provided, the flow of which is shown in FIG. 9. The method of Embodiment 3 is substantially the same with that of Embodiment 2, and the difference is that in Embodiment 3, the type of TU carried by GEM is negotiated through OMCI before the data is received. The method includes the following steps:

901: Performing a negotiation through OMCI, and obtaining type indicator of TU carried by GEM.

For example, an ONT in GPON initiatively reports to an OLT the type of a TU to be transmitted by the ONT, the OLT makes a response acknowledging that it has received the report of the ONT, it may also be that an OLT initiatively reports to an ONT the type of a TU to be transmitted by the OLT, the ONT makes a response acknowledging that it has received the report of the OLT. Of course, the embodiment of the present invention is not limited to the above negotiation manner, and other negotiation manners can also be adopted.

902: Receiving a GEM frame.

903: Extracting a TU that is loaded in payload part of the GEM frame.

904: Performing transmission of the TU according to the type thereof or obtaining corresponding SDH service data from the payload part thereof.

In this embodiment, SDH service is received and de-capsulated, considering features of the SDH service transmitted according to the method of Embodiment 1, and service transmission of the de-capsulated TU is performed or the corresponding SDH service data is extracted from the payload part of the TU. In addition, in this embodiment of the present invention, several extracted tributary units are buffered at receiving side which needs to perform service forwarding. When there occurs a halt in the receiving of PON encapsulation method data frames, the buffered tributary units are transmitted, thereby avoiding clock jitter resulted from service halt caused by situations such as ranging process.

A system that is applied to the above transmission method will now be described in detail.

Embodiment 4

Figure 10:
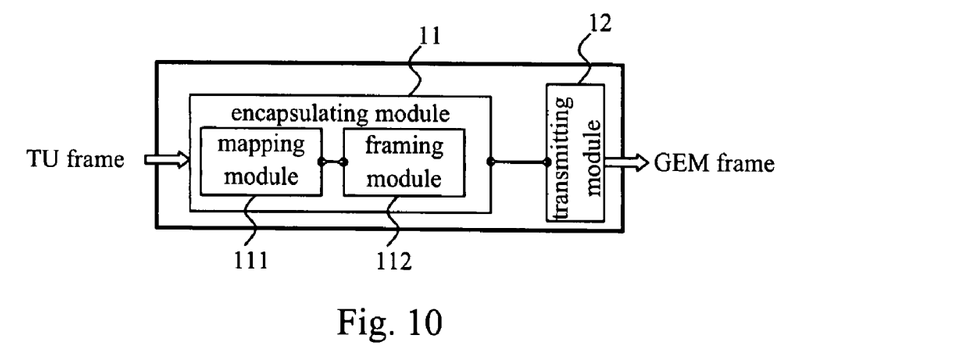
FIG. 10 is a schematic diagram of the structure of an SDH service transmitting device according to a fourth embodiment of the present invention.

An SDH transmission device is provided, as shown in FIG. 10. The method includes an encapsulating module 11 and a transmitting module 12.

The encapsulating module 11 is used to encapsulate a tributary unit that carries SDH service data into a PON encapsulation method data frame. The encapsulating module 12 includes a mapping module 111 and a framing module 112.

The mapping module 111 is used to map a tributary unit that carries SDH service data into payload part of a PON encapsulation method data frame.

The framing module 112 is used to add a frame header of PON encapsulation method data frame to the payload of the PON encapsulation method data frame generated by the mapping module 111 so as to form the PON encapsulation method data frame.

The transmitting module 12 is used to transmitting the PON encapsulation method data frame formed by the encapsulating module 11.

The SDH service transmitting module of this embodiment may encapsulate and carry the SDH service by adopting the method of Embodiment 1. The SDH service transmitting module of this embodiment may be deployed in a practical network flexibly, for example, it may be deployed in an OLT device at a central office, or it may be deployed in an ONU or ONT device at user side.

SDH tributary units may be directly mapped into GEM frames by using the SDH service transmission device of this embodiment, thereby accomplishing the transmission of SDH service in GPON. Standard frame structure of the SDH tributary unit may be adopted, and therefore the device of the present invention can be merged with SDH network directly, and the extraction of VC that includes SDH service data and service clock synchronization can be achieved conveniently on the basis of the pointer adjustment mechanism of the tributary unit.

In addition, the device of this embodiment also provides the specific solution of mapping TDM services at different data rates into different types of tributary units and encapsulating the TUs into GEM frames periodically, so that the device of the embodiment can be applied in the existing GPON system.

Embodiment 5

Figure 11:
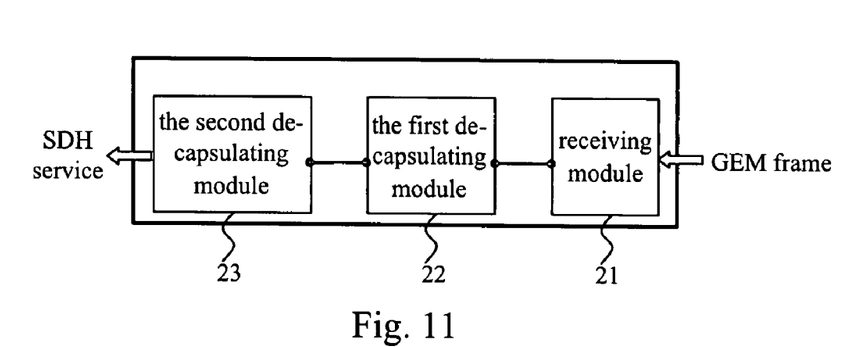
FIG. 11 is a schematic diagram of the structure of an SDH service receiving device according to a fifth embodiment of the present invention.

An SDH service receiving device is provided, as shown in FIG. 11. The device includes a receiving module 21, a first de-capsulating module 22 and a second de-capsulating module 23.

The receiving module 21 is used to receive a PON encapsulation method data frame.

The first de-capsulating module 22 is used to extract tributary units that are loaded into payload part of the PON encapsulation method data frame.

The second de-capsulating module 23 is used to obtain TDM service data from payload part of the tributary units extracted by the first de-capsulating module 22.

The SDH service de-capsulating devices of this embodiment may receive and de-capsulate SDH service by adopting the method of Embodiment 2. The SDH service receiving device, in a practical network, may be employed in an ONU/ONT device at user side.

Figure 12:
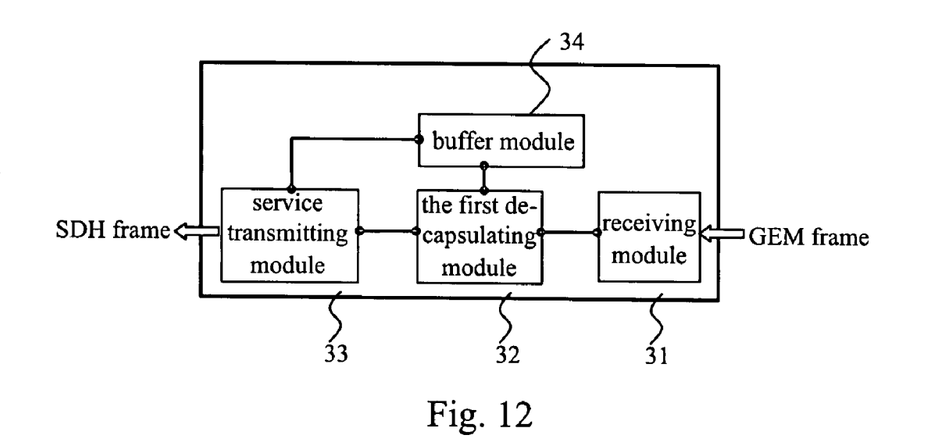
FIG. 12 is a schematic diagram of the structure of an SDH service receiving device according to a sixth embodiment of the present invention.

Embodiment 6 an SDH service receiving device is provided, as shown in FIG. 12. The method includes a receiving module 31, a first de-capsulating module 32, a service transmission module 33 and a buffer module 34.

The receiving module 31 is used to receive a PON encapsulation method data frame.

The first de-capsulated module 32 is used to extract SDH tributary units in payload part of the PON encapsulation method data frame received by the receiving module 31.

The service transmission module 33 is used to transmit the tributary units extracted by the first de-capsulated module 32.

The buffer module 34 is used to buffer several extracted tributary units; and when there occurs a halt in the receiving of the PON encapsulation method data frame, the buffered tributary units are provided to the service transmission module 33 for transmission.

The SDH service receiving device of this embodiment may receive and de-capsulate SDH service by adopting the method of embodiment 2. The SDH de-capsulating device of this embodiment may be deployed in an OLT device at a central office so that a GPON network may be connected to an SDH network directly to perform service transmission.

The SDH service receiving devices of embodiments 5 and 6 receive and de-capsulate SDH service, considering the features of SDH tributary units being mapped into GEM frames so as to achieve transmission of SDH service in GPON; and perform service transmission of the obtained TUs or extract corresponding SDH service data from the payload part of GEM. In addition, the receiving device of the embodiment buffers tributary units at receiving side that needs to forward service, and when there occurs a halt in the receiving of PON encapsulation method data frames, the buffered tributary units are transmitted, thereby avoiding clock jitter resulted from a service halt caused by situations such as ranging.

The method and device of carrying and receiving TDM service provided by the embodiments of the present invention are explained in detail as above. Though the present invention has been illustrated and described with reference to some preferred embodiments of the present invention, those skilled in the art should understand that various changes may be made in form and detail without departing from the spirit and the scope of the present invention and therefore should be covered in the protection scope of the present invention defined by the appended claims and its equivalents.

What is claimed is:

1. A method of carrying a synchronous digital hierarchy (SDH) service over a gigabit passive optical network (GPON), comprising:

encapsulating, by a device, a tributary unit carrying SDH service data into a GPON encapsulation method data frame, wherein the GPON encapsulation method data frame comprises a Payload Length Indicator (PLI) indicating a type and a length of the tributary unit, and wherein the tributary unit is not modified in a frame structure before being encapsulated into the GPON encapsulation method data frame; and transmitting, by the device, the GPON encapsulation method data frame.

2. The method according to claim 1, wherein encapsulating the tributary unit carrying the SDH service data into the GPON encapsulation method data frame comprises:

mapping the tributary unit into payload part of the GPON encapsulation method data frame; and adding a header of the GPON encapsulation method data frame to form the GPON encapsulation method data frame.

3. The method according to claim 2, wherein the tributary unit comprises a first tributary unit, a second tributary unit and a third tributary unit; and each tributary unit is periodically mapped into the GPON encapsulation method data frame according to its respective framing period and is transmitted.

4. The method according to claim 1, wherein the SDH service comprises TDM service, and loading TDM service data into the tributary unit comprises:

mapping the TDM service data into a corresponding SDH standard container according to data rate of the TDM service data;

adding path overhead to the standard container to form a virtual container; and adding pointer overhead to form the tributary unit.

5. The method according to claim 3, further comprising:

loading T1 service at a data rate of 1544 kbps and E1 service at a data rate of 2048 kbps into the first tributary unit;

loading T2 service at a data rate of 6312 kbps into the second tributary unit; and loading T3 service at a data rate of 44736 kbps and E3 service at a data rate of 34368 kbps into the third tributary unit.

6. A method of receiving a synchronous digital hierarchy (SDH) service in a gigabit passive optical network (GPON), comprising:

receiving, by a device, a GPON encapsulation method data frame; and extracting, by the device, an SDH tributary unit that is loaded in a payload part of the GPON encapsulation method data frame, wherein the GPON encapsulation method data frame comprises a Payload Length Indicator (PLI) indicating a type and a length of the SDH tributary unit, and wherein the SDH tributary unit is not modified in a frame structure before being encapsulated into the GPON encapsulation method data frame.

7. The method according to claim 6, further comprising:
transmitting the SDH tributary unit.

8. The method according to claim 7, further comprising:
buffering several extracted tributary units, and transmitting the buffered tributary units when there occurs a halt in the receiving of the GPON encapsulation method data frame.

9. The method according to claim 6, further comprising:
obtaining SDH service data from a payload of the tributary unit.

10. The method according to claim 9, wherein obtaining the SDH service data from the payload of the tributary unit comprises:

obtaining a type of the tributary unit carried by the GPON encapsulation method data frame; and extracting the SDH service data from the payload of the tributary unit according to the type of the tributary unit.

11. The method according to claim 10, wherein obtaining the type of the tributary unit carried by the GPON encapsulation method data frame comprises:

obtaining the type of the tributary unit carried by the GPON encapsulation method data frame according to the PLI in the GPON encapsulation method data frame; or obtaining the type of the tributary unit carried by the GPON encapsulation method data frame through control interface negotiation.

12. A device of transmitting a synchronous digital hierarchy (SDH) service, comprising:

an encapsulating module, adapted to encapsulate a tributary unit carrying SDH service data into a gigabit passive optical network (GPON) encapsulation method data frame, wherein the GPON encapsulation method data frame comprises a Payload Length Indicator (PLI) indicating a type and a length of the tributary unit structure, and wherein the tributary unit is not modified in a frame structure before being encapsulated into the GPON encapsulation method data frame; and a transmitting module, adapted to transmit the GPON encapsulation method data frame.

13. The device according to claim 12, wherein the encapsulating module comprises:

a mapping module, adapted to map the tributary unit into a payload part of the GPON encapsulation method data frame; and a framing module, adapted to add a GPON encapsulation method data frame header to the payload part of the GPON encapsulation method data frame to form the GPON encapsulation method data frame.

14. A device of receiving a synchronous digital hierarchy (SDH) service, comprising:

a receiving module, adapted to receive a gigabit passive optical network (GPON) encapsulation method data frame; and a first de-capsulating module, adapted to extract from the received GPON encapsulation method data frame an SDH tributary unit that is loaded in a payload part of the GPON encapsulation method data frame, wherein the GPON encapsulation method data frame comprises a Payload Length Indicator (PLI) indicating a type and a length of the SDH tributary unit structure, and wherein the SDH tributary unit is not modified in a frame structure before being encapsulated into the GPON encapsulation method data frame.

15. The device according to claim 14, further comprising:
a second de-capsulating module, adapted to obtain TDM service data from the payload part of the tributary unit obtained from the first de-capsulating module.

16. The device according to claim 14, further comprising:
a service transmitting module, adapted to transmit the SDH tributary unit; and a buffer module, adapted to buffer several extracted tributary units, and provide the buffered tributary units to the service transmitting module for transmission when a halt occurs in the receiving of the GPON encapsulation method data frame.

17. A method of mapping a synchronous digital hierarchy (SDH) data frame into a gigabit passive optical network (GPON) data frame, comprising:

mapping, by a device, the entire data frame of an SDH tributary unit into a payload part of a GPON data frame, wherein the GPON data frame comprises a Payload Length Indicator (PLI) indicating a type and a length of the SDH tributary unit structure, and wherein the SDH tributary unit is not modified in a frame structure before being encapsulated into the GPON data frame; and identifying, by the device, a type of the tributary unit in the payload part of the GPON data frame using the PLI in a header of the GPON data frame.

18. The method according to claim 17, wherein the tributary unit comprises: a first tributary unit, a second tributary unit, and a third tributary unit.

19. The method according to claim 17, wherein, when the tributary unit is a first tributary unit or a second tributary unit, each tributary unit is mapped into the payload part of one GPON data frame; and when the tributary unit is a third tributary unit, each tributary unit is mapped into the payload part of one GPON data frame.

20. A method of transmitting a synchronous digital hierarchy (SDH) service over a gigabit passive optical network (GPON), comprising:

encapsulating, by a first device, a tributary unit carrying SDH service data into a GPON encapsulation method data frame, wherein the tributary unit is not modified in a frame structure before being encapsulated into the GPON encapsulation method data frame;

transmitting, by the first device, the GPON encapsulation method data frame;

performing a negotiation through an ONU Management and Control Interface (OMCI), and obtaining a type indicator of the tributary unit in the GPON encapsulation method data frame;

receiving, by a second device, the GPON encapsulation method data frame; and extracting, by the second device, the tributary unit that is loaded in a payload part of the GPON encapsulation method data frame based on the negotiated type indicator of the tributary unit.

21. The method according to claim 20, wherein encapsulating the tributary unit carrying the SDH service data into the GPON encapsulation method data frame comprises:

mapping the tributary unit into the payload part of the GPON encapsulation method data frame; and adding a header of the GPON encapsulation method data frame to form the GPON encapsulation method data frame.

22. The method according to claim 21, wherein the tributary unit comprises a first tributary unit, a second tributary unit, and a third tributary unit; and each tributary unit is periodically mapped into the GPON encapsulation method data frame according to its respective framing period and is transmitted.

* * * * *

UNITED STATES PATENT AND TRADEMARK OFFICE
CERTIFICATE OF CORRECTION

PATENT NO. : 7,894,485 B2
APPLICATION NO. : 11/889630
DATED : February 22, 2011
INVENTOR(S) : Frank Effenberger et al.

Page 1 of 1

It is certified that error appears in the above-identified patent and that said Letters Patent is hereby corrected as shown below:

Title Page, Item (12), please change "Frank et al." to -- Effenberger et al. --.

Title Page, Item (75), please change "Effenberger Frank, Shenzhen (CN)" to -- Frank Effenberger, Freehold, NJ (US) --.

Signed and Sealed this
Twenty-fifth Day of September, 2012

David J. Kappos
*Director of the United States Patent and Trademark Office*